(12) United States Patent
Drosendahl et al.

(10) Patent No.: US 7,568,538 B2
(45) Date of Patent: Aug. 4, 2009

(54) CHILDREN'S RIDE-ON VEHICLE CHARGING ASSEMBLIES WITH BACK FEED PROTECTION

(75) Inventors: Steven Robert Drosendahl, Orchard Park, NY (US); Stephen J. Michalak, Lancaster, NY (US); Jeffrey W. Reynolds, East Aurora, NY (US)

(73) Assignee: Mattel, Inc., El Segundo, CA (US)

( * ) Notice: Subject to any disclaimer, the term of this patent is extended or adjusted under 35 U.S.C. 154(b) by 468 days.

(21) Appl. No.: 11/344,651

(22) Filed: Jan. 31, 2006

(65) Prior Publication Data

US 2006/0170187 A1 Aug. 3, 2006

Related U.S. Application Data

(60) Provisional application No. 60/649,857, filed on Feb. 2, 2005.

(51) Int. Cl.
*H01M 10/44* (2006.01)
*H01M 10/46* (2006.01)

(52) U.S. Cl. .............. 180/65.1; 180/68.5; 320/134; 320/149; 320/155; 446/454; 446/457; 446/90; 439/97; 439/123; 439/188

(58) Field of Classification Search ............ 180/65.1, 180/68.5; 320/134, 149, 155, 124, 136; 439/188, 439/97, 123; 446/454, 457, 90; *H02J 7/00*
See application file for complete search history.

(56) References Cited

U.S. PATENT DOCUMENTS 3,321,691 A 5/1967 Walsh
3,321,692 A 5/1967 Walsh (Continued)

FOREIGN PATENT DOCUMENTS

JP 03-74065 3/1991

OTHER PUBLICATIONS

FirePOD + FireCable Deluxe (with AC adapter), http://www.2.addlogix.com/product.nsf/0/12d28cd94d47eea688256cae006b4159?OpenDocument, pp. 1-2, downloaded Feb. 7, 2005, Addlogix.

(Continued)

*Primary Examiner*—Christopher P Ellis
*Assistant Examiner*—Jacob Meyer
(74) *Attorney, Agent, or Firm*—Dascenzo Intellectual Property Law, P.C.

(57) ABSTRACT

Battery charging assemblies for children's ride-on vehicles, and children's ride-on vehicles that include the same. The charging assemblies may include a power adapter that is adapted to be electrically connected to a power source, a charger cord, and a charging connector that is adapted to electrically interconnect with the rechargeable battery of the ride-on vehicle. The battery charging assemblies further include at least one protective element to prevent or significantly reduce backflow current from the battery into the battery charging assembly. The protective element may be located in the charging probe or at any point along the charger cord of the battery charging assembly. The protective element may include any suitable current-limiting or current-interrupting device. Examples of such current limiting devices include, without limitation, a fuse, a circuit breaker, an anti-backflow diode, and a resettable fuse such as a positive temperature coefficient resistor (PTC resistor).

26 Claims, 5 Drawing Sheets

U.S. PATENT DOCUMENTS

| | | | |
|---|---|---|---|
| 3,376,488 | A | 4/1968 | Walsh |
| 3,387,200 | A | 6/1968 | Godshalk |
| 3,614,582 | A | 10/1971 | Burkett et al. |
| 3,622,991 | A | 11/1971 | Lehrer et al. |
| 3,811,122 | A | 5/1974 | Raber et al. |
| 4,100,917 | A | 7/1978 | Talge et al. |
| 4,109,193 | A | 8/1978 | Schultheis |
| 4,158,802 | A | 6/1979 | Rose, II |
| 4,160,941 | A | 7/1979 | Bennett |
| 4,224,383 | A | 9/1980 | Taylor |
| 4,443,902 | A | 4/1984 | Baer |
| 4,555,451 | A | 11/1985 | Harrod et al. |
| 4,577,263 | A | 3/1986 | Maglica |
| 4,583,035 | A | 4/1986 | Sloan |
| 4,609,861 | A | 9/1986 | Inaniwa et al. |
| 4,625,742 | A | 12/1986 | Phillips |
| 4,658,336 | A | 4/1987 | Maglica |
| 4,746,851 | A | 5/1988 | Mallasz et al. |
| 4,777,424 | A | 10/1988 | Sakamura et al. |
| 4,823,242 | A | 4/1989 | Maglica et al. |
| 4,846,733 | A | 7/1989 | Baisz et al. |
| 4,916,438 | A | 4/1990 | Collins et al. |
| 4,927,366 | A | 5/1990 | Tommerson et al. |
| 4,969,834 | A | 11/1990 | Johnson |
| 5,008,785 | A | 4/1991 | Maglica et al. |
| 5,121,308 | A | 6/1992 | Maglica et al. |
| 5,193,898 | A | 3/1993 | Maglica et al. |
| 5,194,799 | A | 3/1993 | Tomantschger |
| 5,220,268 | A | 6/1993 | Rose et al. |
| 5,229,703 | A | 7/1993 | Harris |
| 5,258,238 | A | 11/1993 | Shimada |
| 5,267,130 | A | 11/1993 | Maglica et al. |
| 5,378,552 | A | 1/1995 | Dixon, Jr. |
| 5,378,554 | A | 1/1995 | Moses |
| 5,419,719 | A * | 5/1995 | Chandler ............... 439/620.33 |
| 5,434,494 | A | 7/1995 | Perego |
| 5,455,752 | A | 10/1995 | Maglica et al. |
| 5,528,472 | A | 6/1996 | Maglica et al. |
| 5,598,084 | A | 1/1997 | Keith |
| 5,619,074 | A | 4/1997 | Berch et al. |
| 5,670,861 | A | 9/1997 | Nor |
| 5,672,952 | A | 9/1997 | Szepesi |
| 5,682,050 | A | 10/1997 | Williams |
| 5,777,868 | A | 7/1998 | Gibboney, Jr. |
| 5,790,355 | A | 8/1998 | Ishmael |
| 5,836,672 | A | 11/1998 | Maglica et al. |
| 5,886,860 | A | 3/1999 | Chen et al. |
| RE36,225 | E | 6/1999 | Harris |
| 5,928,020 | A | 7/1999 | Bishop, Jr. et al. |
| 5,994,845 | A | 11/1999 | Gibboney, Jr. |
| 6,086,219 | A | 7/2000 | Maglica et al. |
| 6,160,389 | A | 12/2000 | Watts |
| 6,195,970 | B1 | 3/2001 | Held et al. |
| 6,208,117 | B1 | 3/2001 | Hibi |
| 6,296,368 | B1 | 10/2001 | Maglica et al. |
| 6,308,059 | B1 | 10/2001 | Domes |
| 6,456,837 | B1 | 9/2002 | Domes |
| 6,457,840 | B2 | 10/2002 | Maglica et al. |
| 6,472,849 | B1 | 10/2002 | Smith |
| 6,509,719 | B2 * | 1/2003 | Crofut et al. ................. 320/134 |
| 6,646,537 | B1 | 11/2003 | Gibboney, Jr. |
| 6,714,348 | B2 | 3/2004 | Dunn |
| 6,788,025 | B2 | 9/2004 | Bertness et al. |
| 6,788,925 | B2 | 9/2004 | Domes |
| 2002/0158609 | A1 * | 10/2002 | Lavington et al. ........... 320/165 |
| 2003/0011344 | A1 | 1/2003 | Bertness et al. |
| 2003/0090791 | A1 | 5/2003 | Dunn |
| 2004/0026946 | A1 | 2/2004 | Reed et al. |
| 2004/0027001 | A1 | 2/2004 | Reed et al. |

OTHER PUBLICATIONS

Premium iPod Car Charger, http://www.macmall.com/macmall/shop/detail~dpno~971448.asp, pp. 1-2, downloaded Feb. 7, 2005, MacMall.

iPod Car Charger for FireWire iPods, http://www.xtrememac.com/adapters/car_chargerfw.shtml, pp. 1-2, downloaded Feb. 7, 2005, Xtreme Accessories, LLC.

International Search Report and Written Opinion for Application No. PCT/US06/03662.

* cited by examiner

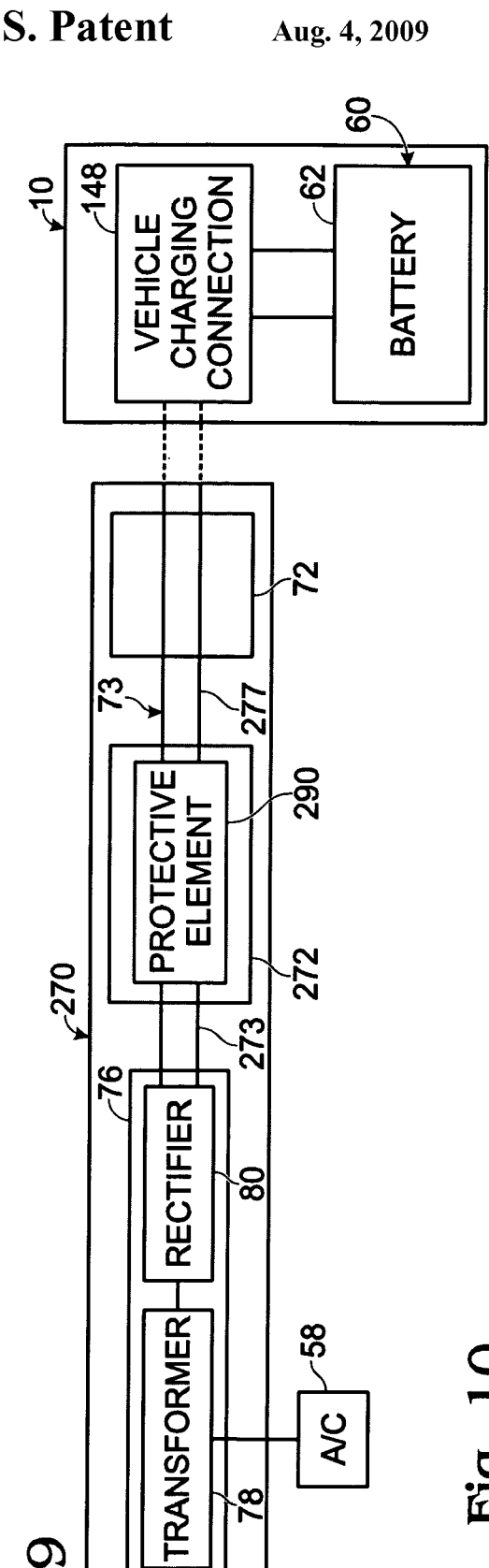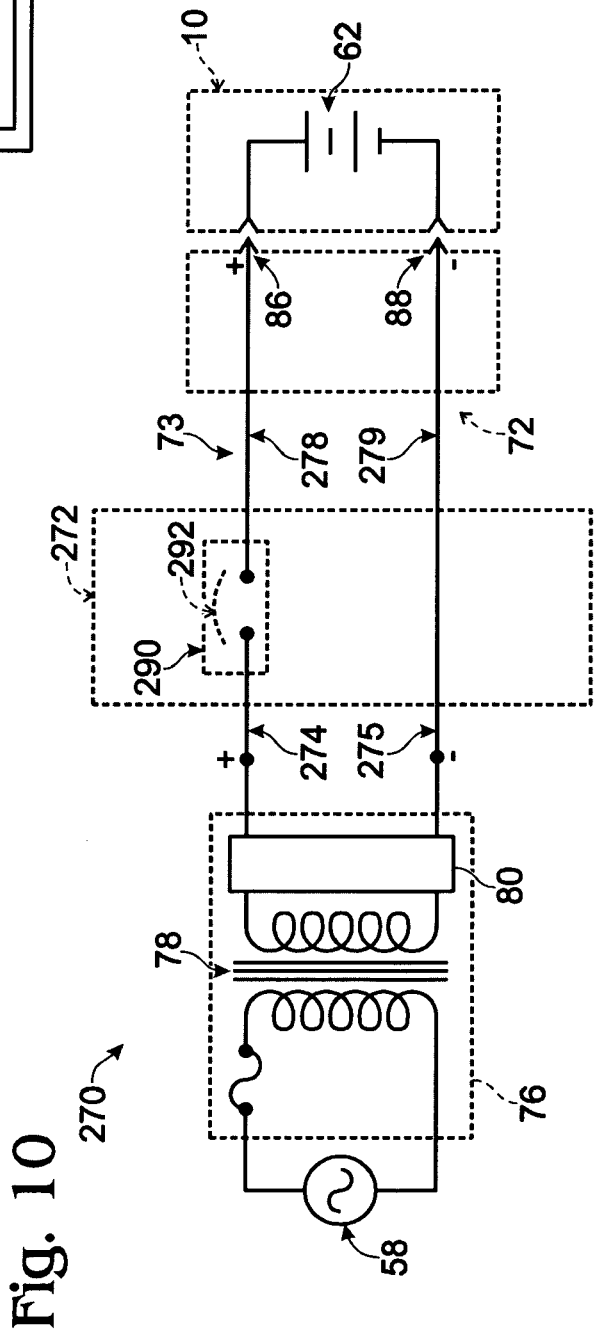
Fig. 9
Fig. 10

CHILDREN'S RIDE-ON VEHICLE CHARGING ASSEMBLIES WITH BACK FEED PROTECTION

RELATED APPLICATION

This application claims priority to U.S. Provisional Patent Application Ser. No. 60/649,857, which was filed on Feb. 2, 2005, and is entitled "Children's Ride-On Vehicle Charging Assemblies with Back Feed Protection." The complete disclosure of the above-identified patent application is hereby incorporated by reference for all purposes.

FIELD OF THE DISCLOSURE

The present disclosure relates to powered ride-on vehicles for children, and more particularly to battery charging assemblies for battery-powered children's ride-on vehicles.

BACKGROUND OF THE DISCLOSURE

Children's ride-on vehicles are reduced-scale vehicles that are designed and sized for use by children. For example, children's ride-on vehicles include a seat adapted to accommodate one or more children as well as steering and drive assemblies that are adapted to be operated by a child sitting on the seat. One type of drive assembly that is often used in children's ride-on vehicles includes a battery-powered motor assembly that is adapted to drive the rotation of one or more of the vehicle's wheels. The motor assembly is powered by a battery assembly, which may include one or more rechargeable batteries. Typically, the vehicle will include an actuator, such as a foot pedal, push button or other user input device, which enables a child to select when power is delivered to the motor assembly. Some drive assemblies further include other user input devices, such as a speed selector and/or a direction selector, which are operated by a child sitting on the vehicle's seat to select the speed and/or direction in which the vehicle travels.

Children's ride-on vehicles are subject to being driven on a variety of surfaces, including concrete, dirt, and grass, as well as up and down hills. As a result, the power requirements for ride-on vehicles vary dramatically during operation. In particular, when driving on level or downhill hard surfaces, the motor may draw relatively little current, such as 2-5 amps. However, when traveling uphill or over rough surfaces like grass and dirt, substantially more current may be drawn, such as 35-40 amps sustained current. Similarly, when a child instantaneously starts the vehicle at full speed, such as by quickly pressing the foot-pedal from an unactuated position to a fully actuated position, a relatively high instantaneous current may be drawn from the battery. Thus, the batteries may be designed to be capable of delivering sufficiently high current levels for satisfactory operation under foreseeable operating conditions. The electrical drive systems of children's ride-on vehicles typically have some sort of current limiting device, such as a fuse or circuit breaker associated with the vehicle's battery assembly or electrically connected between the vehicle's battery assembly and its motor(s). The protection offered by these current limiting devices is necessarily limited by the operational current requirements of the motor(s) and/or other components of the vehicle's drive assembly.

Although a relatively high-current battery may be desirable for adequate vehicle performance, care should be taken when charging such a battery to avoid short circuits or other malfunctions in the battery charging circuit that could result in the battery delivering current, and especially high current, back into the battery charging circuit. The potential for such backflow current makes it desirable to provide protection within the charging circuit to protect against short circuits or other damage to the charging assembly.

A typical battery charging assembly for a battery-powered children's ride-on vehicle comprises a wall-mounted adapter, which contains a transformer and rectifier, a charger cord, and some sort of charging plug, probe or other connector that is adapted to electrically interconnect with the rechargeable battery of the ride-on vehicle. Such an adapter conventionally may include a circuit breaker that is designed to protect against excessive current draw from the AC wall outlet. However, it would be desirable to additionally offer protection against backflow current from the battery into the charging circuit.

SUMMARY OF THE DISCLOSURE

The present disclosure is directed to improved battery charging assemblies for children's ride-on vehicles, and children's ride-on vehicles including the same. The charging assemblies include a power adapter that is adapted to be electrically connected to a power outlet, a charger cord, and a charging connector that is adapted to electrically interconnect with the rechargeable battery of the ride-on vehicle. In some embodiments, the charging connector takes the form of a plug or charging probe. The battery charging assemblies further include a protective element within the charging assembly to prevent or significantly reduce backflow current from the battery into the battery charging assembly. The protective element may be located in the charging connector or at any point along the charger cord of the battery charging assembly. The protective element may include any current limiting or interrupting device. Examples of such current limiting devices include, without limitation, a fuse, a circuit breaker, an anti-backflow diode, and a positive temperature coefficient resistor (PTC resistor).

BRIEF DESCRIPTION OF DRAWINGS

FIG. 8 is an isometric view of another illustrative example of a suitable battery charging assembly according to the present disclosure.

FIG. 9 is a block diagram of the battery charging assembly of FIG. 8.

FIG. 10 is a schematic diagram of another illustrative example of a suitable electrical circuit for a battery charging assembly according to the present disclosure.

DETAILED DESCRIPTION AND BEST MODE OF THE DISCLOSURE

Figure 1:
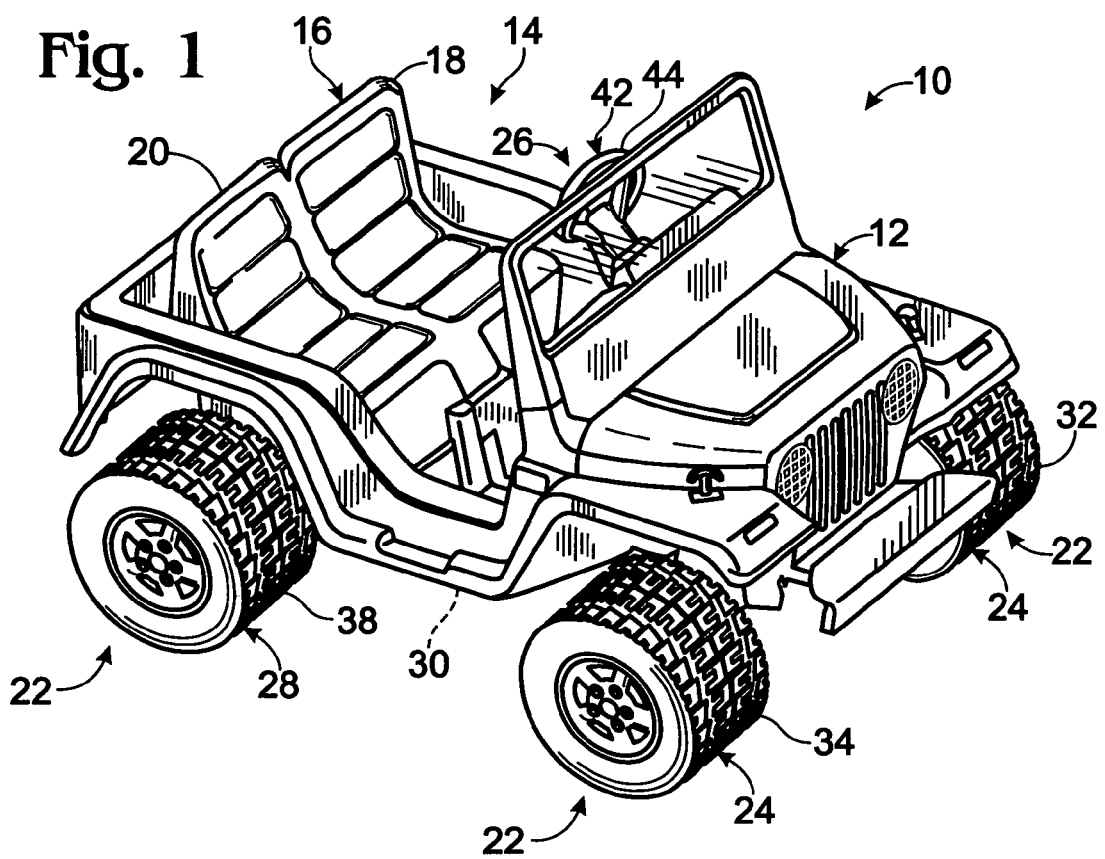
FIG. 1 is an isometric view of a battery-powered children's ride-on vehicle.

An illustrative example of a children's ride-on vehicle is shown in FIG. 1 and indicated generally at 10. Ride-on vehicle 10 includes a support frame, or body, 12 that provides a riding space, or passenger compartment, 14 with a seat assembly 16 that is sized and configured to accommodate at least one child, including a child driver. Seat assembly 16 may be integral with or otherwise mounted on body 12 and may have any suitable configuration, including configurations in which the position of the seat assembly is adjustable within the passenger compartment, and configurations in which the seat assembly includes two or more seats or two or more seating regions. Typically, vehicle 10 will be sized for use by a child driver or by a child driver and a child passenger. For example, in the illustrated embodiment, seat assembly 16 includes a pair of seats, or seating regions, 18 and 20, with seat 18 sized and positioned to receive a child driver and seat 20 sized and positioned to receive a child passenger.

Body 12 typically is formed from molded plastic and may be integrally formed or formed from a plurality of parts that are secured together by screws, bolts, clips or other suitable fasteners. Body 12 may additionally, or alternatively, be at least partially formed from other suitable material(s), such as metal, wood, or composite materials. Body 12 may include an underlying frame on which a chassis is mounted. In such an embodiment, the frame is often formed of metal and/or molded plastic, with the chassis typically formed of molded plastic.

As shown, body 12 is shaped to generally resemble a reduced-scale Jeep® vehicle. JEEP is a registered trademark of the Daimler Chrysler Corporation, and the JEEP mark and designs are used by permission. Children's ride-on vehicles according to the present disclosure may be shaped to generally resemble any type of vehicle. Examples of suitable vehicles are reduced-scale, or child-sized, vehicles that are shaped to resemble corresponding full-sized, or adult-sized, vehicles, such as cars, trucks, construction vehicles, emergency vehicles, off-road vehicles, motorcycles, space vehicles, aircraft, watercraft and the like. However, it is also within the scope of the present disclosure that vehicle 10 may be shaped to resemble fantasy vehicles that do not have a corresponding adult-sized counterpart. Although vehicle 10 is depicted in the form of a reduced-scale Jeep® vehicle, it will be appreciated that the components and/or features of vehicle 10 may be configured for use on any type of children's ride-on vehicle having one or more battery-powered components.

Figure 2:
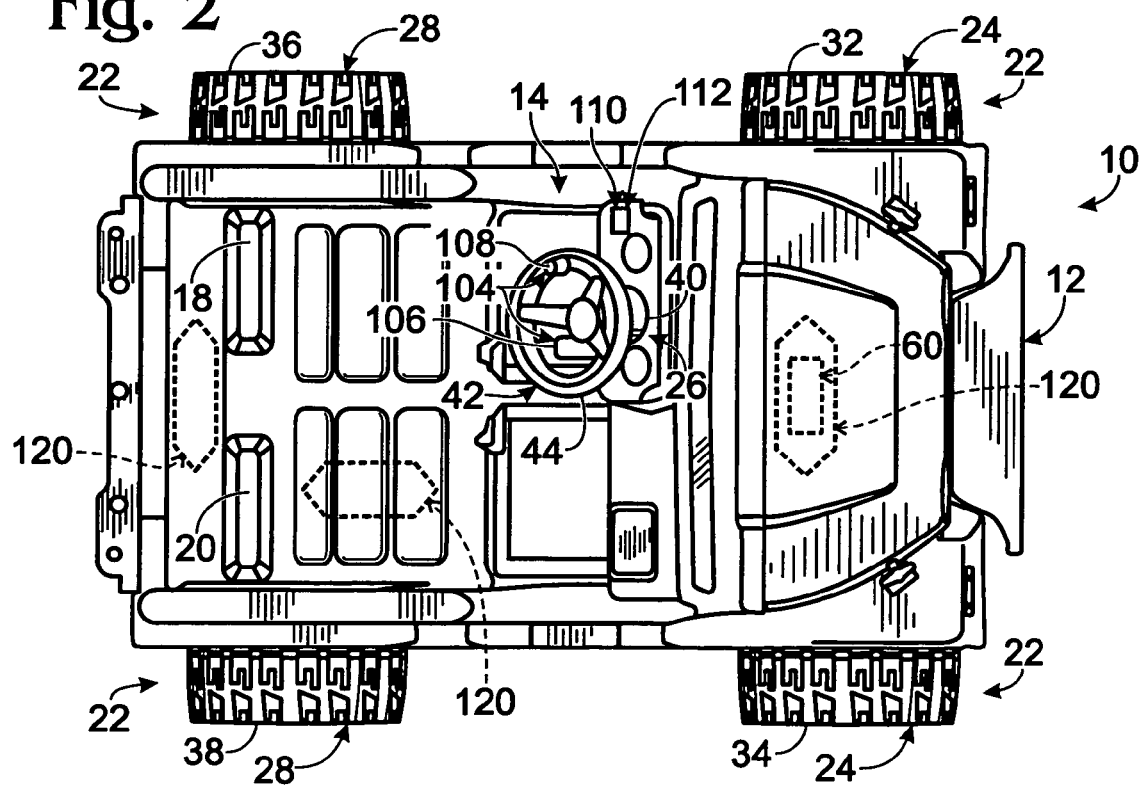
FIG. 2 is a top plan view of the children's ride-on vehicle of FIG. 1.

Body 12 also includes a plurality of wheels 22 that are rotatably coupled to body 12, as indicated in FIGS. 1-2. The plurality of wheels includes a steerable wheel assembly 24 that contains at least one steerable wheel that is adapted to be steered by the vehicle's steering assembly 26, typically at least partially in response to user-imparted steering inputs thereto. The plurality of wheels further includes a driven wheel assembly 28 that contains at least one driven wheel that is adapted to be rotationally driven by the vehicle's drive assembly 30. As used herein, the term "driven wheel" refers to a wheel that is rotated in response to a rotational input from the vehicle's drive assembly, which is either directly conveyed to the wheel by the output of a motor assembly or conveyed through a linkage, such as a gearbox, belt, chain, gear assembly, axle, or the like. In the illustrated embodiment, vehicle 10 includes four wheels 22, with front wheels 32 and 34 forming steerable wheel assembly 24, and rear wheels 36 and 38 forming driven wheel assembly 28. The number of wheels on the vehicle may vary from two wheels to four, six or more wheels. However, children's ride-on vehicles typically include at least three wheels for stability. Similarly, each wheel assembly must contain at least one wheel, and a particular wheel may form all or a portion of both the steerable wheel assembly and the driven wheel assembly. For example, it is within the scope of the disclosure that either or both of front wheels 32 and 34 or rear wheels 36 and 38 are driven and steerable. Similarly, one front wheel and one rear wheel may be driven and/or steerable, or the vehicle may include one or more driven or steerable wheels underneath its body that are generally hidden by the body of the vehicle.

A portion of the vehicle's steering assembly 26 is shown in FIGS. 1 and 2 and includes a steering column 40 (indicated in FIG. 2) and a steering mechanism 42. The steering assembly enables a child sitting on seat 18 to steer the vehicle's steerable wheel assembly 24 via user-applied steering inputs to steering mechanism 42, which is positioned on vehicle 10 for operation by a child sitting on seat 18. In the illustrated embodiment, steering mechanism 42 takes the form of a steering wheel 44. Other suitable structures, such as handlebars and steering levers may be used and are within the scope of the present disclosure. Steering column 40 includes any suitable mechanical linkage that conveys a child's steering inputs from the steering mechanism to the vehicle's steerable wheel assembly, thereby steering the vehicle.

Figure 3:
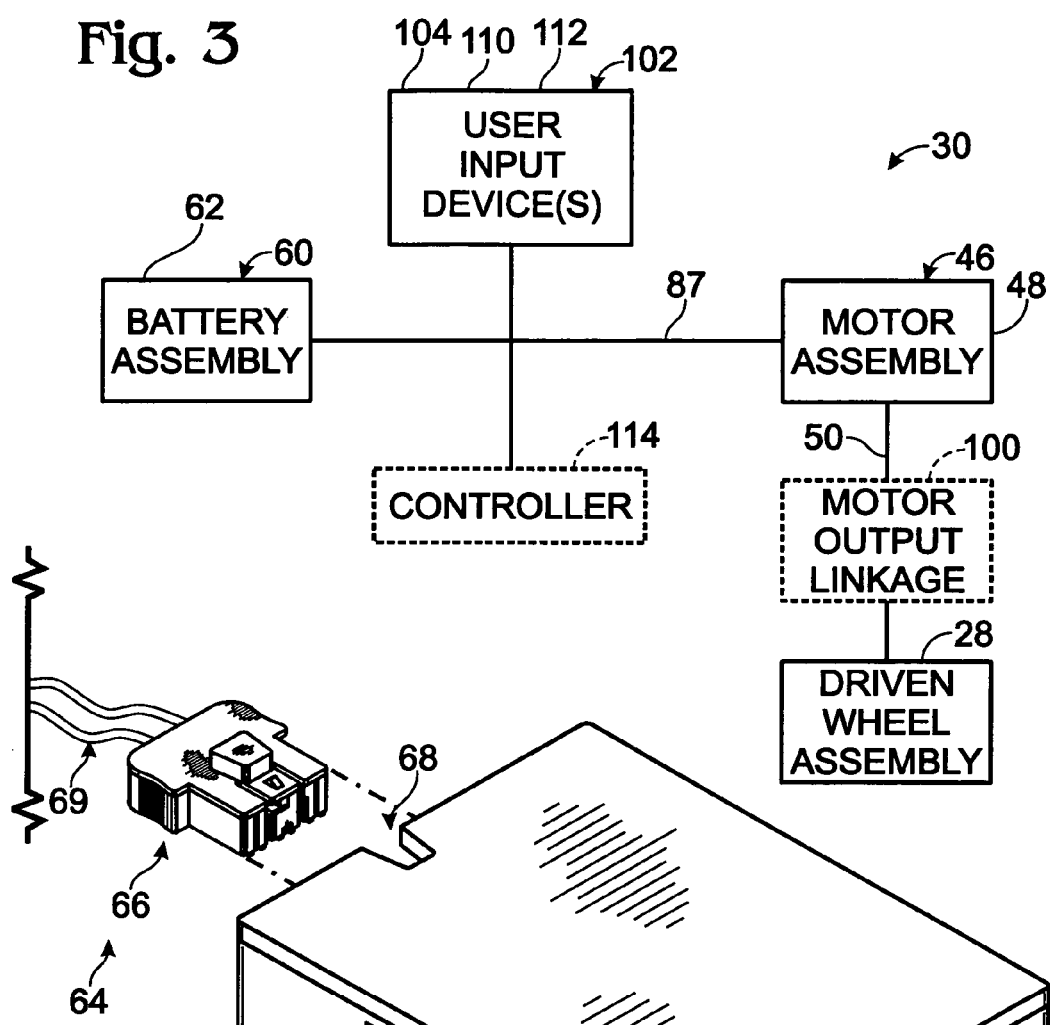
FIG. 3 is a schematic diagram of a suitable drive assembly for the children's ride-on vehicle, such as the vehicle of FIG. 1.

In FIG. 3, an example of a suitable drive assembly 30 for a children's ride-on vehicle, such as vehicle 10, is schematically illustrated. Drive assembly 30 is adapted to drive the rotation of driven wheel assembly 28. The drive assembly 30 includes a motor assembly 46, which includes at least one battery-powered motor 48 that is adapted to drive the rotation of at least one of the plurality of wheels. The motor assembly 46 includes an output 50 that provides a rotational input to the driven wheel assembly 28. Typically, the output 50 from each of the at least one motors includes a rotating shaft and/or a rotation pinion or output gear. Output 50 may include more than one shaft, pinion, and/or gear, such as when motor assembly 46 includes more than one motor and/or when driven wheel assembly 28 includes more than one driven wheel. Motor assembly 46 may also be configured to power other moveable components on vehicle 10, such as depending on the form of the vehicle. For example, the motor assembly 46 may be coupled to raise and lower the blade of a ride-on that resembles a bulldozer, the bucket of a ride-on that resembles a skid-steer or other loader, the bed of a ride-on that resembles a dump truck, etc.

Figure 4:
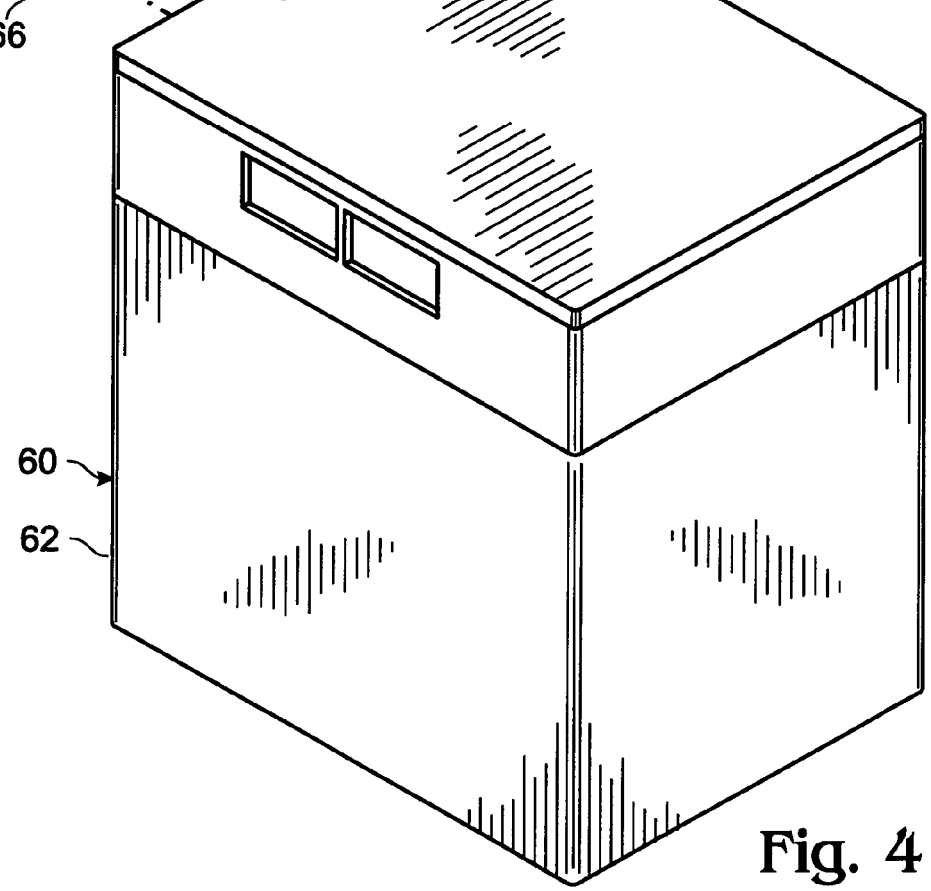
FIG. 4 is an isometric view of an illustrative battery assembly with portions of the vehicle's wiring harness and charging assembly shown in fragmentary.

Power for the motor assembly is provided by battery assembly 60. Battery assembly 60 includes at least one rechargeable battery, or cell, 62 that is adapted to provide power to the motor assembly. As discussed in more detail herein, the batteries in battery assembly 60 are preferably able to be selectively disconnected from the motor assembly and connected to a charging assembly to recharge the batteries. Any suitable type and number of batteries, or cells, may be used in battery assembly 60. For example, one or more six-, twelve-, eighteen-, or twenty-four-volt batteries have proven effective. An illustrative example of a battery assembly 60 is shown in FIG. 4. Also shown in FIG. 4 is a connector assembly 64 to transmit power from the battery assembly to the motor assembly. Thus, the motor assembly 46 is operably connected to the battery assembly 60 by any suitable electrical connectors, such as cables, wires, or positive and negative terminals or leads, and the like. In the exemplary battery assembly shown generally in FIG. 4, the connector assembly 64 includes a plug 66 that fits into a socket 68 that is electrically connected to the battery assembly 60. The plug 66 connects to wires, or electrical cables, 69 that transmit electrical power from the battery assembly 60 to the motor assembly 46 and thereby form a portion of the wiring harness of the vehicle's drive assembly 30. It is within the scope of the present disclosure that vehicle 10 may include any other suitable structure for conducting electrical power from the battery assembly 60 to the motor assembly 46, with the connector assembly 64 of FIG. 4 merely providing an illustrative example. For example, it is within the scope of the present disclosure that the battery assembly may include an electrical connector, such as a plug or socket, that extends from the housing of the battery assembly and is electrically connected thereto by lengths of wires.

In FIG. 3, drive assembly 30 is shown further including an optional motor output linkage 100 that mechanically interconnects the motor assembly 46 with the driven wheel assembly 28. Motor output linkage 100 is any suitable mechanism that transmits the rotational input from the motor assembly's output(s) to the driven wheel assembly 28. Examples of suitable linkages include an intermediate linkage between the output 50 of the motor assembly 46 and the driven wheel assembly 28, such as a gearbox containing one or more gears, a belt or chain drive, a worm gear, one or more individual gears, and the like. The motor output linkage 100 may be adapted to transmit the rotational input from the output 50 to the driven wheel assembly 28 at the same relative rate of rotation, or it may mechanically augment the rotational input to convey a greater or lesser rate of rotation relative to the rate of rotation of the output 50. It is also within the scope of the disclosure that drive assembly 30 may be formed without motor output linkage 100, in which case rotational input from the output(s) of the motor assembly 46 may be directly transmitted to the driven wheel assembly 28.

Drive assembly 30 also includes one or more user input devices 102 that are adapted to convey inputs from a child sitting on seat 18 to the drive assembly. User input devices 102 also may be referred to as user control devices. These devices convey a user's inputs, such as via the vehicle's wiring harness 87, and affect the actuation of the motor assembly 46, such as by causing the actuation (or energization) of the motor assembly, selecting between a range of electronic configurations, selecting the direction of rotation of the motor assembly's output 50, selecting the relative degree of a maximum rate of rotation to which the motor assembly is actuated, etc. Examples of suitable devices 102 include a drive actuator 104, through which a user input directing the battery assembly 60 to energize the motor assembly 46 is received. Examples of suitable drive actuators 104 include an on/off switch, a foot pedal, a throttle lever, and a rotational handgrip on a steering mechanism that includes a handlebar. In FIG. 2, an example of a drive actuator 104 is shown in the form of a foot pedal 106 positioned for actuation by a child sitting on seat 18. When drive actuator 104 takes a form other than a foot pedal, it may be located in any suitable location within or near passenger compartment 14 so that a child sitting on seat 18 may reach the actuator while positioned to operate the vehicle 10. For example, an on/off switch or throttle may be located on the body or on the steering mechanism 42, such as illustrated at 108 in FIG. 2.

As schematically illustrated in FIGS. 2 and 3, other examples of user input devices 102 include a speed switch 110, which enables a user to select the relative rate of rotation of the motor assembly's output 50, and a direction switch 112, which enables a user to select the relative direction (i.e., clockwise or counterclockwise) of rotation of output 50 and thereby configure the vehicle 10 to drive in forward and reverse directions. Switches 110 and 112 may be located in any suitable location on body 12 or steering assembly 26 for actuation by a child sitting on seat 18. An example of a suitable speed switch 110 is a switch that selectively configures a pair of batteries between series and parallel configurations to define relative "high" and "low" speed configurations. Speed switch 110 may additionally or alternatively selectively configure a pair of motors between series and parallel configurations. As a further example, the switches may convey inputs to a controller, such as subsequently described controller 114, which, responsive to inputs from the switches, configures the vehicle 10 for a selected operating state.

As illustrated in FIG. 3, drive assembly 30 may (but is not required to) further include a controller 114, which is adapted to control electronically the transmission of the rotational input from the motor assembly 46 to the driven wheel assembly 28. More specifically, controller 114 may include a microprocessor or suitable control circuit that is adapted to control the actuation, or energization, of the motor assembly 46 by the battery assembly 60 to regulate electronically the rotational input transmitted by the motor assembly 46 to the driven wheel assembly 28. Controller 114 may regulate at least one of the timing and the ramp, or rate, of application of the transmission of the rotational input after actuation of a corresponding user input device 102 by a child sitting on seat 18. In other words, the controller 114 may delay in at least time and/or rate of transmission the rotational input to the driven wheel assembly 28 responsive at least in part to a user input selecting the desired, or selected, rotational input. An illustrative example of a suitable controller is disclosed in U.S. Pat. No. 6,771,034, the complete disclosure of which is hereby incorporated by reference for all purposes. As used herein, the one or more user input devices 102 and, when present, controller 114 that are adapted to configure the vehicle's drive assembly 30 between a plurality of operating states may be referred to collectively as the vehicle's speed control assembly 118.

As shown in FIG. 2, body 12 also includes at least one battery compartment 120 that is adapted to receive battery assembly 60. The battery compartment may take any of a variety of different shapes, sizes, and configurations depending on such factors as the form of vehicle 10, the portion of the vehicle's body within which the compartment is formed, and the size and shape of battery assembly 60. FIG. 2 provides graphical illustrations of several suitable, non-exclusive positions for battery compartment 120. The battery compartment may include a cover or other closure to selectively restrict access to the battery assembly during use of the vehicle. The compartment may additionally or alternatively include a suitable retainer to position and/or secure the battery assembly within the battery compartment.

Figure 5:
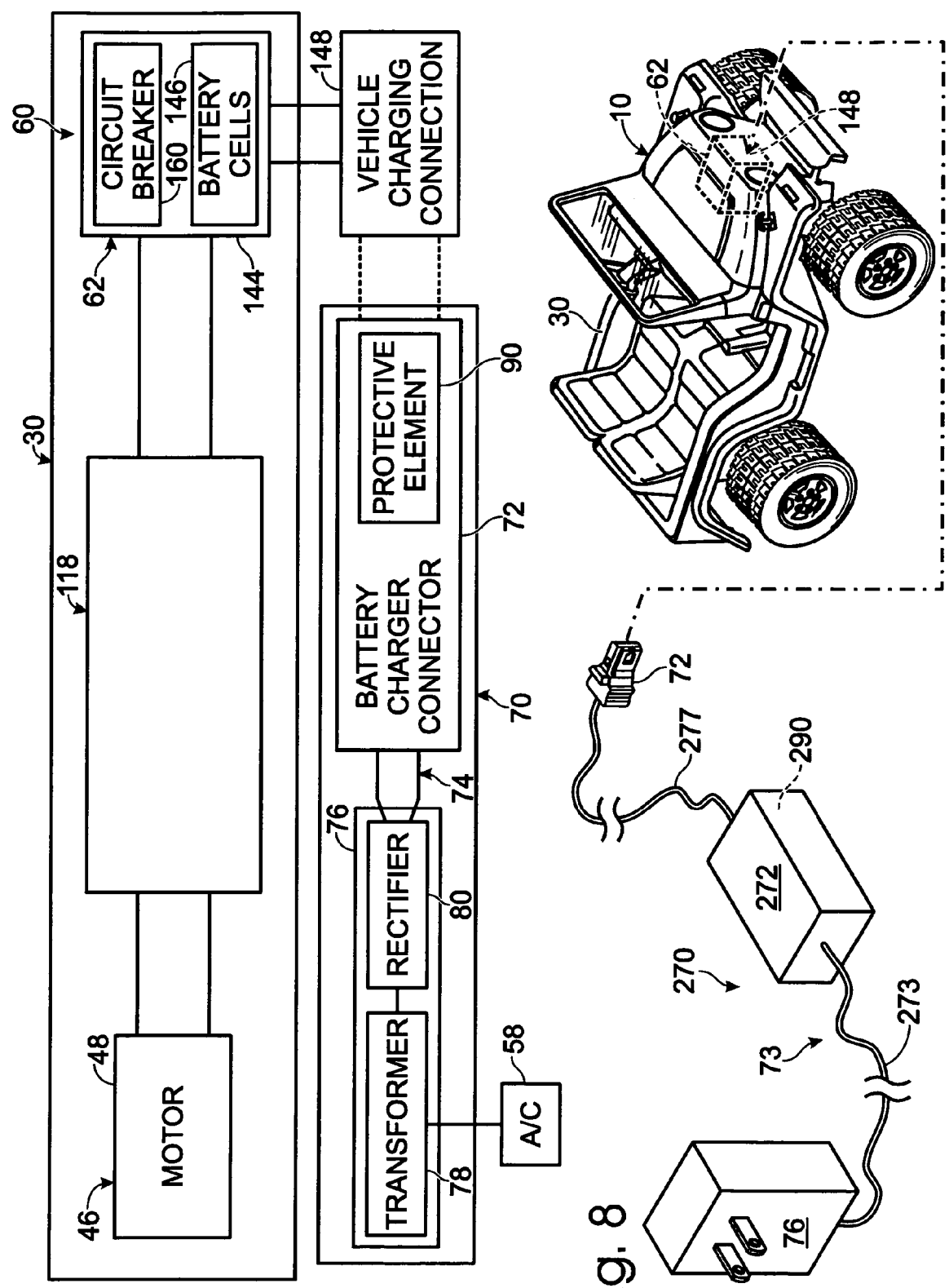
FIG. 5 is a block diagram schematically illustrating portions of the drive assembly of FIG. 3 and an example of a battery charging assembly according to the present disclosure.

As discussed, battery assembly 60 is preferably rechargeable by electrically interconnecting the battery assembly with a battery charging assembly that is adapted to recharge the one or more batteries or cells forming battery assembly 60. In FIG. 5, a portion of an illustrative drive assembly 30 is schematically illustrated along with an illustrative example of a battery charging assembly 70 according to the present disclosure. As used herein, vehicle 10 and battery charging assembly 70 may be collectively referred to as a children's ride-on vehicle assembly, or as a vehicle assembly. In the illustrative example, and in the following discussion, the drive assembly 30 will be discussed in the context of a motor 48 and a battery 62 for the purpose of simplicity. However, and as discussed above, it is within the scope of the present disclosure that more than one of either or both of these components may be used in motor assembly 46 and battery assembly 60. In FIG. 5, the drive assembly 30 is shown including a schematically illustrated speed control assembly 118, which as discussed, may be adapted to provide selective control and/or adjustment of one or more of the vehicle's speed, on/off state, selected direction of movement, selected speed, rate of acceleration, etc. The electrical interconnections of the components presented in FIG. 5 have been schematically illustrated and may take any suitable form, including wires, mating electrical contacts, conductive linkages, and the like.

In the illustrative example of a battery 62 shown in FIG. 5, the battery includes a housing 144 containing at least one cell 146, and typically a plurality of cells 146. While not required to all embodiments of the present disclosure, the illustrated battery includes a circuit breaker 160, which is connected to the battery's cells 146 inside housing 144. Circuit breaker 160 is designed to provide protection from excessive current, which may arise due to short circuits or other problems. However, the protection offered by circuit breaker 160 may vary depending on how circuit breaker 160 is wired into the electrical system of vehicle 10. If circuit breaker 160 is intended to provide over-current protection in the drive assembly 30, the protection offered by circuit breaker 160 may necessarily be limited by the operational current requirements of motor or motors 48, which as discussed may in some embodiments be in excess of 35-40 amps sustained current.

Battery 62 (and/or battery assembly 60) may also include a vehicle charging connection 148 that is electrically connected to the battery and adapted to conduct a charging current to the cell(s) in the battery upon electrical interconnection of the battery charging assembly 70 with a source current, such as AC power source 58. Charging connection 148 is preferably adapted to electrically and mechanically interconnect with a charging connector 72 of battery charging assembly 70 to provide a secure connection therebetween. While not required to all embodiments, it is within the scope of the present disclosure that the battery may be adapted to be electrically connected to the battery charging assembly to recharge the battery without removing the battery from the vehicle's battery compartment.

Battery charging assembly 70 may be mounted on the vehicle or it may be a separate external structure that is selectively interconnected with at least the one or more batteries and/or cells in battery assembly 60. As shown in the schematic example presented in FIG. 5, battery charging assembly 70 includes a battery charging connector 72 that is adapted to interconnect with charging connection 148, a charger cord 73, and an adapter body 76. Adapter body 76 may be adapted to be electrically connected to receive a source current, such as from an AC power source 58, which may be in the form of a conventional wall outlet. Adapter body 76 may further include a transformer 78 and a rectifier 80 to provide an appropriate DC charging current from the source current. In other words, the transformer and rectifier may be configured to receive the source current, such as from AC power source 58, and to convert the source current to a suitable DC charging current for charging battery 62 (or battery assembly 60). As used herein, the battery charging assembly, the power source, and one or more batteries to which the charging assembly is electrically interconnected may be referred to as establishing a charging circuit.

Figure 6:
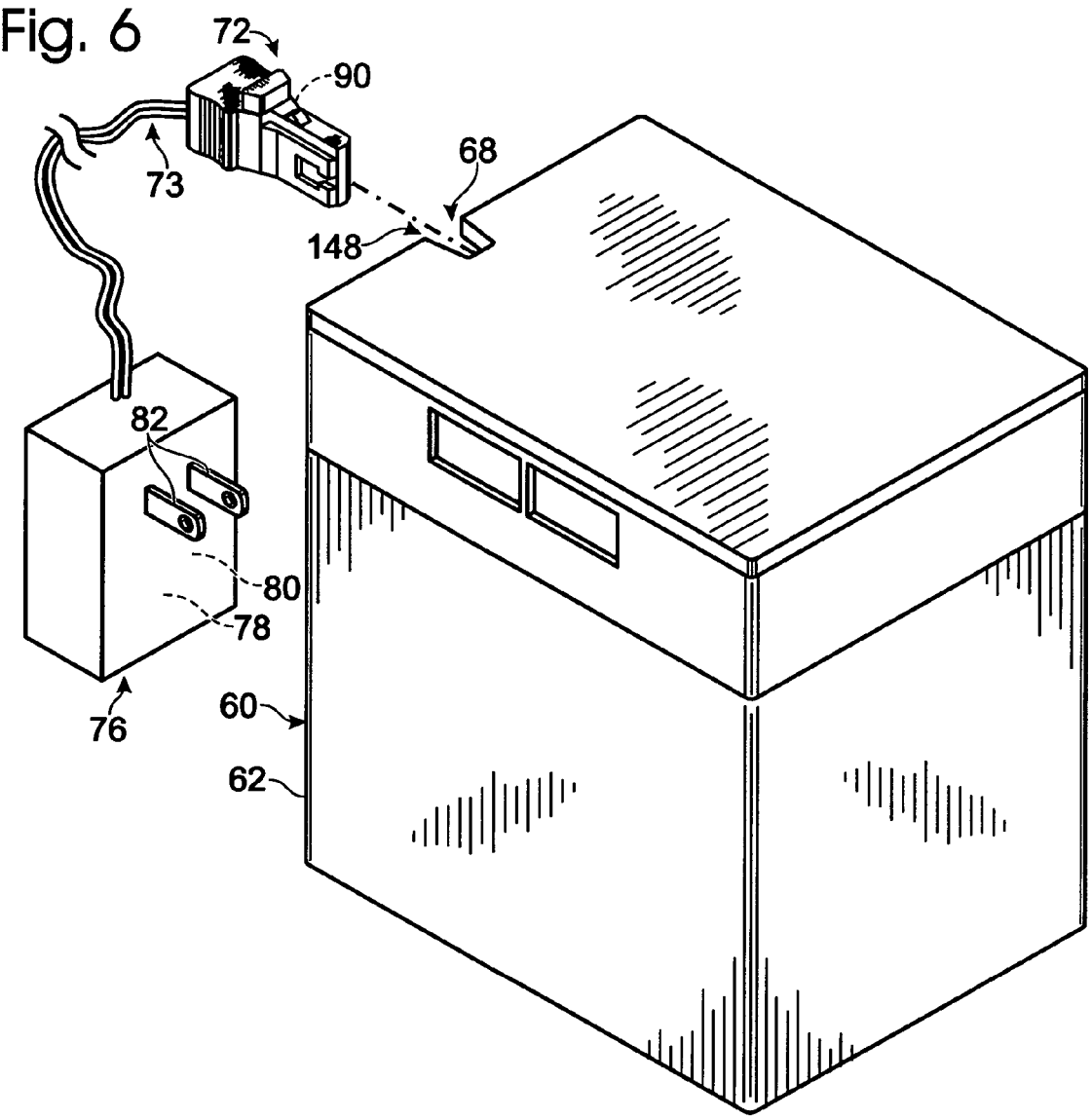
FIG. 6 is an isometric view of the illustrative battery of FIG. 4 and a battery charging assembly according to the present disclosure.

The battery charging connector 72 and the vehicle charging connection 148 may have any suitable shape and/or structure that permits these components to be selectively electrically and mechanically interconnected when it is desirable to charge the battery assembly 60 with charging assembly 70. For example, the battery (or battery assembly) may each include connectors that are suitably shaped to be electrically and mechanically interconnected together. Illustrative examples of a suitable construction is for one of the components to take the form of a socket and one of the components to take the form of a plug that is adapted to be received at least partially in the socket to establish an electrical interconnection therebetween. As a less schematic example, FIG. 6 provides an example of a vehicle charging connection 148 in the form of a socket 68 configured to operatively receive battery charging connector 72, which is illustrated in the form of a plug or charging probe. As also shown in FIG. 6, the charging connector 72 is electrically interconnected with adapter body 76 by charger cord 73, with the adapter body including contacts 82 that are adapted to be inserted into a conventional wall outlet to receive a source current therefrom. It is within the scope of the present disclosure that battery charging connector 72 may include a socket or other suitable type and/or shape of connector that is configured to operatively establish an electrical connection with vehicle charging connection 148, such as may take the form of a plug or other suitably shaped connector. It is also within the scope of the present disclosure that the vehicle charging connection may be mounted on, or coupled to, the body of the vehicle, such as to permit recharging of the battery assembly without accessing the vehicle's battery compartment.

As shown in FIGS. 5 and 6, battery charging assemblies according to the present disclosure include at least one protective element 90 that is adapted to provide protection against damage to the charging assembly 70 or other components of the charging circuit due to back feed, or the backflow of current from the battery 62, into the charging assembly 70. As illustrated in FIGS. 5 and 6, the battery charging connection of the charging assembly may include at least one such protective element, although it is within the scope of the present disclosure that a protective element may additionally or alternatively be elsewhere positioned within the charging assembly.

Charger cord 73 may vary in length without departing from the scope of the present disclosure, and typically is at least one foot, and typically several feet, long. If charger cord 73 is cut or damaged, the conductors leading to battery charging connector 72 may remain electrically connected to battery 62 such that backflow current from battery 62 into charger cord 73 may be possible, such as due to a short circuit. The over-current protection offered by any device incorporated into battery 62, such as circuit breaker 160, may be limited by the operational current requirements of the drive assembly 30 and/or the charging circuit. However, incorporation of protective element 90 into battery charging assembly 70, such as within battery charging connector 72, may provide protection against this back fed current because, even if charger cord 73 is damaged or cut, protective element 90 may substantially reduce or eliminate the potential for backflow current from battery 62 into charger cord 73.

In contrast to circuit breaker 160, which may be intended to protect motor assembly 46 and/or other components of the drive assembly of vehicle 10, protective element 90 is intended to protect from exposure to backflow current objects or individuals that contact the charging assembly while it is electrically connected to the battery (or battery assembly). As such, protective element 90 may be configured to limit, or cutoff, backflow current into charger cord 73 at a lower threshold than circuit breaker 160 (when such a circuit breaker is present in a particular embodiment). As discussed, protective element 90 may be configured to reduce, or prevent, the backflow of current from the battery assembly through the protective element, and thereby to components of the battery charging assembly downstream from the protective element (relative to the battery assembly). This reduction or restriction may be automatic, i.e., protective element 90 may be adapted to automatically reduce or prevent this backflow of current whenever such a current reaches the protective element. Alternatively, the protective element may be configured to reduce or prevent the backflow of current if the backflow current exceeds a preselected, or predetermined, threshold current. Illustrative, non-exclusive examples of threshold currents include 5 amps, 8 amps, 10 amps, etc. Protective elements may also be configured to restrict or prevent the backflow of current within a preselected time period after the backflow current reaches the protective element and/or after the backflow current is present (or sustained) for a predetermined, or preselected, time period, such as 2 seconds, 3 seconds, 5 seconds, 10 seconds, etc. For example, if charger cord 73 of battery charging assembly 70 is damaged or cut such that a short circuit is present, protective element 90 will act to either cut off or significantly reduce the backflow current from battery 62 into charger cord 73. Illustrative nonexclusive examples of suitable constructions for protective element 90 may include one or more protective devices such as a fuse, a resettable circuit breaker, a diode, and/or a positive temperature coefficient resistor (PTC resistor).

As schematically illustrated in FIG. 5, battery charging assembly 70 is located outside of drive assembly 30, so protective element 90 need not carry motor drive currents. As such, protective element 90 will not be subject to the operational current requirements of motor 48. During normal operation, protective element 90 will only need to carry the relatively low battery charging current that is output by battery charging assembly 70. As an illustrative, non-exclusive example, this current may be approximately 1 amp. However, higher and lower charging currents are within the scope of the present disclosure. For example, the charging current may vary with such factors as the type and/or capacity of the battery, the desired charging time and/or method, design preferences, etc.

As discussed, protective element 90 may have a lower activation threshold current than circuit breaker 160 and may provide a greater level of protection against short circuits or other damage to the charging circuit. Through appropriate location of protective element 90 within battery charging assembly 70, protective element 90 may be able to effectively prevent the battery 62 from delivering backflow current into battery charging assembly 70. While adapter body 76 may include a current limiting device such as a circuit breaker, such a device provides protection against excessive current draw from the power source, such as an AC wall outlet, rather than protection against backflow current from the battery 62 into the battery charging assembly 70, which may be provided by protective element 90. Thus, protective element 90 may offer increased levels of protection against short circuits and backflow current from the battery 62 that may result from damage to the charging circuit or battery charging assembly 70.

Although vehicle charging connection 148 is shown outside of drive assembly 30 in FIG. 5, it is within the scope of the present disclosure for charging connection 148 to be within drive assembly 30. As discussed, it is within the scope of the present disclosure for the battery assembly 60 of vehicle 10 to be adapted to be electrically connected to the drive assembly 30 or the charging assembly 70, but not both at the same time.

Figure 7:
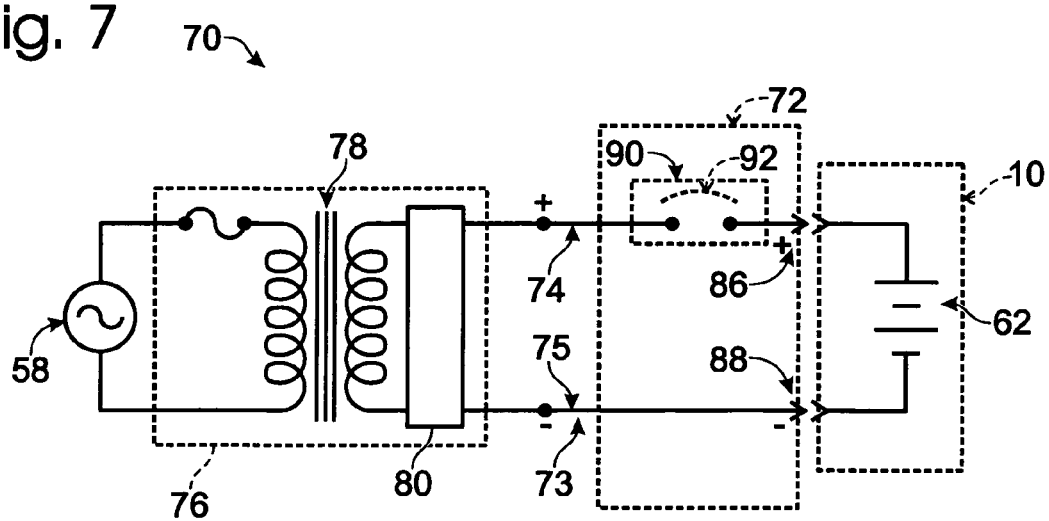
FIG. 7 is a schematic diagram of a suitable electrical circuit for battery charging assemblies according to the present disclosure.

In FIG. 7, a schematic diagram of an illustrative, non-exclusive example of a suitable electrical circuit for battery charging assembly 70 is shown. As illustrated, the positive and negative outputs of rectifier 80 may be connected to positive conductor 74 and negative conductor 75 of charger cord 73, respectively. Positive conductor 74 and negative conductor 75 may terminate in battery charging connector 72 at positive contact 86 and negative contact 88, respectively. As discussed, in some embodiments, battery charging connector 72 may take the form of a charging probe, in which case positive contact 86 and negative contact 88 may be exposed metal contact surfaces or tabs on battery charging connector 72.

Protective element 90 may comprise one or more protective devices such as a circuit breaker, a fuse, a reverse blocking diode, and/or a resettable fuse, such as a PTC resistor. It is also within the scope of the present disclosure that a replaceable fuse may be utilized for protective element 90. Although several illustrative examples of suitable types of current limiting devices have been provided, it is within the scope of this disclosure that any suitable number, type and/or arrangement of devices capable of sufficiently limiting and/or interrupting undesirable backflow current while still enabling the required charging functionality of charging assembly 70 may be used for or in protective element 90. As a non-exclusive illustrative example, the schematic diagram of FIG. 7 shows that protective element 90 may comprise a circuit breaker 92, which may be interposed into positive conductor 74 within charging connector 72.

It is within the scope of the present disclosure that protective element 90 may comprise one or more individual devices, each of which may be one of several possible types of protective device. In embodiments where protective element 90 comprises a plurality of protective devices, the individual protective devices may be incorporated into battery charging assembly 70 in parallel and/or in series. Appropriate selection of the number and types of protective devices and the particular circuit design (e.g. series, parallel, or series-parallel) may allow establishment of an appropriate protective current threshold and time interval in which backflow current into charger cord 73 may be reduced or eliminated. For example, a circuit breaker or a fuse may prevent all backflow current from battery 62 into charger cord 73, but only after a threshold current has been reached. In contrast, a reverse blocking diode may prevent all backflow current from battery 62 into charger cord 73. And, while a PTC resistor will not block all backflow current from battery 62 into charger cord 73, an otherwise excessive current through a PTC resistor may be reduced to an acceptable level due to the increase in resistance within the PTC resistor resulting from excessive current flow heating up the PTC resistor.

Although FIG. 7 illustrates protective element 90 as being optionally interposed on positive conductor 74, it is within the scope of the present disclosure for protective devices such as a circuit breaker, a fuse, and/or a resettable fuse, such as a PTC resistor, to be optionally and/or alternatively interposed into either or both of positive conductor 74 and/or negative conductor 75. A reverse blocking diode may also be interposed into either or both of positive conductor 74 and/or negative conductor 75. However, a reverse blocking diode should be connected into the charging circuit with proper polarity to permit functioning of battery charging assembly 70 and to block backflow current from battery 62 into battery charging assembly 70 and/or charger cord 73.

In some embodiments, battery charging connector 72 may be configured such that it is mechanically keyed or polarized, so as to assure that battery charging assembly 70 may only be connected to vehicle charging connection 148 with proper polarity. By "keyed," it is meant that the charging connector 72 and/or charging connection 148 are shaped and/or sized so that the components may only be mated in such a manner as to create an electrical interconnection having a suitable polarity for charging battery 62. It is noted that, for a negatively grounded electrical system, the charging assembly may include one or more of the protective devices comprising protective element 90 interposed into positive conductor 74, as shown in FIG. 7.

In FIGS. 8 and 9, another illustrative, non-exclusive example of a battery charging assembly according to the present disclosure that includes at least one protective element is shown. As illustrated, the battery charging assembly is generally indicated at 270 and includes at least one protective element 290. In FIG. 8, an illustrative example of a children's ride-on vehicle 10 with a battery assembly having at least one battery 62 with a battery charging connector 140 is shown, albeit in reduced-scale relative to the charging assembly. Unless otherwise specified, battery charging assembly 270 may contain the same structure, functionality, and variations as the previously described battery charging assemblies 70 (and protective elements 90), and is also adapted for use with a children's ride-on vehicle, such as vehicle 10. Battery charging assembly 270 houses a protective element 290 within a distinct protective element housing 272 in which the protective element is electrically interconnected between adapter body 76 and battery charging connector 72. In the illustrated example, lengths 273 and 277 of charger cord 73 extend on both sides of housing 272 to electrically interconnect housing 272, or at least the protective element 290 contained therewithin, with the adapter body 76 and battery charging connector 72, respectively. It is within the scope of the present disclosure that the relative lengths 273 and 277 of cord 73 on either side of housing 272 may vary. It is also within the scope of the present disclosure that housing 272 may be interconnected to adapter body 76 and/or battery charging connector 72 without the use of a length 273 or 277 of cord 73 to interconnect these components on at least one side of the protective element housing. Protective element 290 may either be used to provide additional protection to battery charging assembly 270 or as a substitute for protective element 90 that might otherwise have been housed within battery charging connector 72. Battery charging assembly 270 may thus be utilized if physical sizing or some other constraint or design preference precludes inclusion of protective element 90 into battery charging connector 72.

In FIG. 10, an illustrative example of a suitable electrical schematic diagram for battery charging assembly 270 is shown. In battery charging assembly 270, the positive and negative outputs of rectifier 80 may be connected to positive upstream conductor 274 and negative upstream conductor 275 of charger cord 73, respectively, both of which may extend into protective element housing 272. As shown in FIG. 10, negative upstream conductor 275 may be connected to negative downstream conductor 279 within protective element housing 272, while protective element 290 may be interposed between positive upstream conductor 274 and positive downstream conductor 278. Positive downstream conductor 278 and negative downstream conductor 279 may extend from protective element housing 272 and may terminate in battery charging connector 72 at positive contact 86 and negative contact 88, respectively.

Similar to protective element 90, protective element 290 may comprise one or more protective devices, such as a circuit breaker, a fuse, a reverse blocking diode, and/or a resettable fuse, such as a PTC resistor. It is also within the scope of the present disclosure that a replaceable fuse may be utilized for protective element 290. Although multiple types of current limiting devices have been listed here, it is within the scope of this disclosure that any suitable number, type and/or arrangement of devices capable of sufficiently limiting and/or interrupting undesirable backflow current while still enabling the required charging functionality of charging assembly 270 may be used for or in protective element 290. As a nonexclusive illustrative example, the schematic diagram of FIG. 10 shows that protective element 290 may comprise a circuit breaker 292, which may be interposed between positive upstream conductor 274 and positive downstream conductor 278 within protective element housing 272.

Although FIG. 10 illustrates protective element 290 as being optionally interposed between positive upstream conductor 274 and positive downstream conductor 278, it is within the scope of this disclosure for a circuit breaker, a fuse, and/or a PTC resistor to be optionally and/or alternatively interposed between positive upstream conductor 274 and positive downstream conductor 278 and/or between negative upstream conductor 275 and negative downstream conductor 279. A reverse blocking diode may also be interposed between positive upstream conductor 274 and positive downstream conductor 278 and/or between negative upstream conductor 275 and negative downstream conductor 279. However, a reverse blocking diode must be connected into the charging circuit with proper polarity to permit functioning of the battery charging assembly 270 and to block backflow current from battery 62 into the upstream portion 273 of charger cord 73.

In some embodiments, battery charging connector 72 may be configured such that it is mechanically keyed or polarized, so as to assure that battery charging assembly 270 may only be connected to vehicle charging connection 148 with suitable polarity for charging battery 62. It is noted that, for a negatively grounded electrical system, the battery charging assembly 270 may have one or more of the protective devices comprising protective element 290 interposed between positive upstream conductor 274 and positive downstream conductor 278, as shown in FIG. 10.

INDUSTRIAL APPLICABILITY

The present disclosure is applicable to battery-powered children's ride-on vehicles with battery-powered motor assemblies that are powered by rechargeable batteries.

It is believed that the disclosure set forth herein encompasses multiple distinct inventions with independent utility. While each of these inventions has been disclosed in its preferred form, the specific embodiments thereof as disclosed and illustrated herein are not to be considered in a limiting sense as numerous variations are possible. The subject matter of the disclosure includes all novel and non-obvious combinations and subcombinations of the various elements, features, functions and/or properties disclosed herein. Similarly, where the claims recite "a" or "a first" element or the equivalent thereof, such claims should be understood to include incorporation of one or more such elements, neither requiring nor excluding two or more such elements.

It is believed that the following claims particularly point out certain combinations and subcombinations that are directed to one of the disclosed inventions and are novel and non-obvious. Inventions embodied in other combinations and subcombinations of features, functions, elements and/or properties may be claimed through amendment of the present claims or presentation of new claims in this or a related application. Such amended or new claims, whether they are directed to a different invention or directed to the same invention, whether different, broader, narrower or equal in scope to the original claims, are also regarded as included within the subject matter of the inventions of the present disclosure.

We claim:
1. A children's ride-on vehicle assembly, comprising:
a children's ride-on vehicle, comprising:
a body having at least one seat sized for a child;
a plurality of wheels rotatably coupled to the body, wherein the plurality of wheels includes at least one driven wheel and at least one steerable wheel;
a steering assembly comprising a steering mechanism adapted to receive steering inputs from a child sitting on the at least one seat, and a steering linkage adapted to convey the steering inputs to the at least one steerable wheel;
a drive assembly adapted to selectively drive the rotation of the at least one driven wheel, wherein the drive assembly comprises:
a motor assembly comprising at least one electric motor,
a speed control assembly, and
a battery assembly adapted to selectively energize the motor assembly and including at least one rechargeable battery and
a charging connection electrically connected to the at least one rechargeable battery; and
a battery charging assembly, comprising:
an adapter body configured to convert a source current to a charging current suitable to charge the at least one battery;
a charger cord extending from the adapter body and terminating within a charging connector housing, wherein the charging connector housing is configured to directly engage the charging connection of the battery assembly to establish an electrical connection between the adapter body and the at least one battery; and
at least one protective element configured to reduce backflow current from the battery assembly in the entirety of the charger cord, wherein the at least one protective element is enclosed within the charging connector housing.

2. The vehicle assembly of claim 1, wherein the adapter body includes a rectifier to convert an AC source current to a DC charging current.

3. The vehicle assembly of claim 1, wherein the at least one protective element comprises a plurality of protective elements electrically connected in series.

4. The vehicle assembly of claim 1, wherein the at least one protective element comprises a plurality of protective elements electrically connected in parallel.

5. The vehicle assembly of claim 1, wherein the at least one protective element enclosed within the charging connector housing is a first protective element, the battery charging assembly includes a protective element housing disposed on the charger cord intermediate the adapter body and the charging connector housing, and a second protective element is disposed within the protective element housing.

6. The vehicle assembly of claim 1, wherein the protective element comprises a fuse.

7. The vehicle assembly of claim 1, wherein the protective element comprises a circuit breaker.

8. The vehicle assembly of claim 1, wherein the protective element comprises a diode.

9. The vehicle assembly of claim 1, wherein the protective element comprises a resettable fuse.

10. The vehicle assembly of claim 1, wherein the protective element comprises a PTC resistor.

11. The vehicle assembly of claim 1, wherein the protective element is adapted to prevent backflow current from the battery assembly from passing through the protective element.

12. The vehicle assembly of claim 1, wherein the protective element is adapted to interrupt backflow current from the battery assembly if the backflow current exceeds a predetermined threshold current.

13. The vehicle assembly of claim 1, wherein the protective element is adapted to interrupt backflow current from the battery assembly if the backflow current exceeds a predetermined threshold current for at least a predetermined time period.

14. The vehicle assembly of claim 1, wherein the charging connection comprises a socket configured to receive the charging connector housing therein.

15. The vehicle assembly of claim 14, wherein the socket is keyed to receive the charging connector housing such as to establish a suitable polarity between the charging assembly and the battery.

16. The vehicle assembly of claim 1, wherein:
the charger cord includes a positive conductor and a negative conductor;
the charging connector housing includes a positive contact and a negative contact;
the positive and negative conductors terminate at respective ones of the positive and negative contacts;
the at least one protective element disposed within the charging connector housing is adapted to electrically disconnect at least one of the positive and negative conductors from the respective one of the positive and negative contacts; and
the electrical disconnect between the positive conductor and the positive contact is within the charging connector housing.

17. A children's ride-on vehicle assembly, comprising:
a children's ride-on vehicle, the vehicle comprising:
a body with a seat adapted to receive a child;
a rechargeable battery disposed in the body, the battery comprising positive and negative terminals; and
a charging connection comprising positive and negative contacts in electrical communication with the respective positive and negative terminals of the battery; and
a battery charging assembly adapted to deliver a charging current to the battery, wherein the battery charging assembly comprises:
a charging probe comprising positive and negative contacts configured to directly engage the corresponding positive and negative contacts of the charging connection;
an adapter body housing a transformer;
a charger cord electrically connecting the transformer to the positive and negative contacts of the charging probe, the charger cord extending from the adapter body and terminating within the charging probe; and
at least one protective element configured to reduce backflow current from the battery in the entirety of the charger cord, wherein the at least one protective element is enclosed within the charging probe.

18. The vehicle assembly of claim 17, wherein the at least one protective element enclosed within the charging probe is a first protective element, and a second protective element is disposed on the charger cord intermediate the adapter body and the charging probe.

19. The vehicle assembly of claim 17, wherein the at least one protective element is interposed into a conductor that is electrically connected to the positive contact of the charging probe.

20. The vehicle assembly of claim 17, wherein the at least one protective element comprises a resettable fuse.

21. The vehicle assembly of claim 17, wherein the at least one protective element comprises a PTC resistor.

22. The vehicle assembly of claim 17, wherein the protective element is adapted to prevent backflow current from the battery from passing through the protective element.

23. The vehicle assembly of claim 17, wherein the protective element is adapted to interrupt backflow current from the battery if the backflow current exceeds a predetermined threshold current.

24. The vehicle assembly of claim 17, wherein the protective element is adapted to interrupt backflow current from the battery if the backflow current exceeds a predetermined threshold current for at least a predetermined time period.

25. The vehicle assembly of claim 17, wherein the charger cord includes a positive conductor and a negative conductor;
- the positive and negative conductors terminate at respective ones of the positive and negative contacts of the charging probe;
- the at least one protective element enclosed within the charging probe is adapted to electrically disconnect at least one of the positive and negative conductors from the respective one of the positive and negative contacts of the charging probe; and
- the electrical disconnect between the positive conductor and the positive contact of the charging probe is within the charging probe.

26. A children's ride-on vehicle assembly, comprising:
a children's ride-on vehicle, the vehicle comprising:
- a body with a seat adapted to receive a child;
- a rechargeable battery disposed in the body, the battery comprising positive and negative terminals; and
- a charging connection comprising positive and negative contacts in electrical communication with the respective positive and negative terminals of the rechargeable battery; and a battery charging assembly adapted to deliver a charging current to the rechargeable battery, wherein the battery charging assembly comprises:
- an adapter body configured to convert a source current to a charging current suitable to charge the rechargeable battery;
- a charger cord extending from the adapter body and terminating within a charging connector housing, wherein the charging connector housing is configured to directly engage the charging connection to establish an electrical connection between the adapter body and the rechargeable battery; and
- a protective element configured to interrupt backflow current from the rechargeable battery in the entirety of the charger cord if the backflow current exceeds a predetermined threshold current and to permit forward-flow current from the adapter body to the rechargeable battery after an event in which the backflow current exceeds the predetermined threshold current, wherein the protective element is enclosed within the charging connector housing.

* * * * *